United States Patent [19]

Heyke et al.

[11] Patent Number: 5,189,080

[45] Date of Patent: Feb. 23, 1993

[54] EPOXY RESIN COMPOSITION FOR ENCAPSULATING ELECTRIC CIRCUIT COMPONENTS

[75] Inventors: Klaus Heyke, Reutlingen-Ohmenhausen; Richard Spitz, Reutlingen; Hans-Joachim Seidel, Waiblingen-Neustadt; Irene Jennrich, Winnenden Birkmannsweiler; Werner Pfander, Fellbach; Armin Vohr, Reutlingen, all of Fed. Rep. of Germany

[73] Assignee: Robert Bosch GmbH, Stuttgart, Fed. Rep. of Germany

[21] Appl. No.: 830,503

[22] Filed: Jan. 31, 1992

Related U.S. Application Data

[63] Continuation of Ser. No. 514,421, Apr. 25, 1990, abandoned.

[30] Foreign Application Priority Data

Apr. 25, 1989 [DE] Fed. Rep. of Germany ....... 3913488

[51] Int. Cl.$^5$ .............................................. C08K 9/06
[52] U.S. Cl. ..................... 523/212; 523/219; 523/443; 523/444
[58] Field of Search ................ 523/212, 219, 443, 444

[56] References Cited

U.S. PATENT DOCUMENTS

| | | | |
|---|---|---|---|
| 3,849,187 | 11/1974 | Fetscher et al. | 428/418 |
| 4,552,907 | 11/1985 | Sato et al. | 523/455 |
| 4,665,111 | 5/1987 | Hussain et al. | 523/428 |
| 4,772,644 | 9/1988 | Itoh et al. | 523/443 |

FOREIGN PATENT DOCUMENTS

0182066B1 9/1988 European Pat. Off. .
3229558C2 11/1984 Fed. Rep. of Germany .

OTHER PUBLICATIONS

Katz et al; Handbook of Fillers and Reinforcement for Plastics; van Nostrand Reinhold Co.; 1978; pp. 326–327.

*Primary Examiner*—Paul R. Michl
*Assistant Examiner*—Edward Cair
*Attorney, Agent, or Firm*—Frishauf, Holtz, Goodman & Woodward

[57] ABSTRACT

An encapsulating resin composition for electrical and electronic components consists of cycloaliphatic epoxy resin, a hardener, an accelerator, a filler and, sometimes, a pigment. As a result of the combination of the cycloaliphatic epoxy resin with the provision of methylnadic anhydride as hardener and amporhous $SiO_2$ as a filler, the material is capable of flowing at room temperature, is physiologically harmless and also otherwise well suited for mass production of a wide variety of electrical and electronic components, for example diodes and other semi-conductors for the motor vehicle industry. A small addition of hollow glass spherical particles counteracts sedimentation of amorphous $SiO_2$ in prehardening storage of the resin.

9 Claims, No Drawings

EPOXY RESIN COMPOSITION FOR ENCAPSULATING ELECTRIC CIRCUIT COMPONENTS

This application is a continuation of application Ser. No. 07/514,421, filed Apr. 25, 1990, now abandoned.

This invention concerns an encapsulating and potting material for electric circuit components, especially electronic components such as semi-conductors, containing a cycloaliphatic epoxide resin or a polyfunctional epoxy novolac-resin, or a mixture of the two, together with a hardener, a hardening accelerator, a filler and, optionally, a pigment.

It is generally known to encapsulate or embed electrical or electronic components in a casting resin or the like in order to protect them from mechanical disturbance and thermal loads.

An encapsulating material for electrical components, for example for impregnating and encapsulating a high-voltage ignition coil, is known from German Patent 32 29 558 which consists of (a) an epoxide resin based on bisphenol A and a cyclo-olefin in the ratio of 70:30, (b) a modified anhydride of a dibasic organic acid, e.g. phthalic anhydride, as a hardening agent, (c) an imidazole as an accelerator and (d) chalk as a filler.

It is further known from the European patent having the publication No. 0 182 066 to provide an encapsulating material for electrical and electronic components, especially for components subject to strong thermal stresses, which is constituted of (a) a cycloaliphatic resin of a particular structure, (b) a liquid diglycidyl-ether-bis-phenol-A epoxide resin, (c) a copolymer of butadiene and acrylonitrile with terminal carboxyl groups, (d) a hardener, (e) an accelerator and (f) a filler mixture of special fused alumina and aluminum particles.

Encapsulating materials for electrical and electronic components, for example diodes and semi-conductors, are, moreover, obtainable commercially. The known encapsulating materials, however, have the disadvantage that they cannot be worked in an ideal fashion, for example they exhibit an unsatisfactory viscosity behavior and they are not physiologically harmless. Furthermore, they have too low a softening temperature and/or an excessive thermal expansion coefficient.

SUMMARY OF THE INVENTION

It is an object of the present invention to provide an encapsulating and potting material for electrical and electronic components having a comparatively low viscosity, which is to say good flowing capability at room temperature, and thus is capable of being worked and shaped, and which is physiologically harmless, and leads to products which not only have a low thermal expansion coefficient, but also are distinguished by having a high glass transition temperature (tg) and has generally a high softening temperature.

Briefly these objectives are attained in that, for every 100 parts, by weight, of the kind of epoxy resin specified in the beginning of this specification, the encapsulating material also contains the following other components:

90–120 parts by weight of methylnadic anhydride as a hardener;

0.2–2 parts by weight of an accelerator of imidazole base;

55–70 parts by weight of a filler of amorphous $SiO_2$ base; and up to two parts by weight of pigment and/or up to 0.5 parts by weight of hollow glass spheres as an additional filler;

The encapsulating materials of the invention have the advantages that at 25° C. they exhibit a viscosity of 40,000 to 80,000 mPas and a density from about 1.5 to 1.7 $g/m^3$.

The processing and hardening of encapsulating materials having embedded electrical or electronic components can be carried out in the usual known way, i.e. by heating for several hours, optionally stepwise with respect to temperature, up to temperatures most commonly from 70° to 220° C.

More particularly the following characteristics of the encapsulating material are obtained after hardening for six hours at 75° C. and a further six hours of hardening at 210° C.:

| | |
|---|---|
| linear thermal expansion coefficient | 25 to 35 × $10^{-6}$ 1/°C. |
| Glass Transition Temperature Tg | 160° C. to 220° C. |
| Heat Conductivity | 0.55 to 0.8 W/mK |

For production of the encapsulating materials of the invention the usual cycloaliphatic epoxide resins can be used which provide low viscosity colorless to yellow liquids, e.g. having a viscosity of 350 mPas at 25° C. and 25 mPas at 80° C. and are commercially available, for example under the trade name or trademark "Araldit", for example Araldit CY 179, from Ciba-Geigy.

Typical cycloaliphatic epoxide resins usable for making the materials of the invention are those having a base of a cyclo-olefin. A particularly useful cycloaliphatic epoxide resin is one on a base of a cyclo-olefin of the following formula

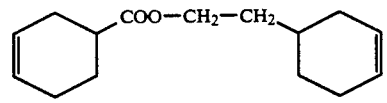

The above-mentioned Araldit CY 179 is an epoxidation product of that cyclo-olefin.

When polyfunctional epoxy-novolac resin is used either alone or mixed with the above-mentioned kind of epoxide resin that polyfunctional resin is involved is preferably a highly viscous or semi-solid resin having a viscosity, according to the DIN 53015 criterion, at 52° C. in the range from 1100 to 70,000 mPas, and as, and especially from 1,100 to 1,700 mPas, for example with structural units of the following formula:

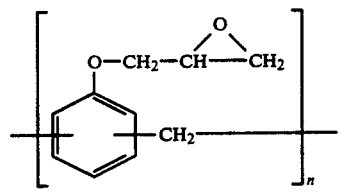

Average value for n = 1.6
Epoxide functionality = 3.6

Such a resin is available from Ciba-Geigy under the trademark and product designation Araldit EPN 1139.

Of particular significance is the hardener used for the production of the encapsulating resins of the invention, namely methylnadic anhydride, often referred to as methylendomethylene tetrahydrophthalic anhydride. It has been found that the use of this hardener, in cooperation with the above-identified resins and accelerator, is essential for the high glass-transition temperature obtainable in accordance with the invention, while the low linear thermal expansion coefficient obtainable in accordance with the invention is obtained especially by the use of a filler on the basis of amorphous $SiO_2$.

It has been found particularly advantageous to use an amorphous $SiO_2$ preliminarily treated with epoxysilane. The pretreatment of the amorphous $SiO_2$ with an epoxysilane serves for improving adhesion capability, protection against moisture and capability of flow. Such amorphous $SiO_2$ products are known and available commercially, for example vitreous silica powder designated by the registered trademark "Silbond". It has been found particularly useful for the filler content to lie between 57 and 61 percent by weight, with reference to the weight of the remaining components of the encapsulating material.

It has also been found particularly advantegous for the chief component of the amorphous $SiO_2$ to have a grain size of from 2um to a maximum of 100um, with the fine material content (<2.5um) being kept as small as possible.

While the silanization or epoxidation of the filler improves the adhesion capability with respect to the other construction components, the grain size distribution of the filler prior to the gelation and hardening phase has the effect of a densification of the filler in the lower product region and thereby a further accomodation (reduction caused by the low linear thermal expansion coefficient of the amorphous $SiO_2$ from $= <0.1 \; 10^{-6} \, 1/°C.$) of the linear thermal expansion coefficient to the components lying in this region, e.g. that of the semi-conductor. The heat conductivity is likewise improved.

By the addition of some hollow glass spheres a tendency to sedimentation of the filler during storage in the premixtures, especially those of the resin components, can be counteracted. Their "floating up" prior to the gelation and hardening phase counteracts the formation of a filler-poor upper layer in the product by sendimentation. This notably minimizes the risk of occurence of cracks during thermo-mechanical stresses such as arise from temperature changes.

As for pigments, those of an iron-oxide base have been found particularly effective, for example black iron oxide with the color index number of "pigment black 11".

The accelerator can consist of one of the usual accelerators having an imidazole base, for example methylated benzimidazole.

The encapsulating composition of the invention, because of its physiologically uncritical behavior, is particularly suitable for encapsulating and potting the widest variety of electrical and electronic components and construction elements made of plastic, metal, ceramic, silicon and the like and therefore for manufacturing a wide variety of components which are exposed to high thermal and/or mechanical loads, as for example diodes and semiconductors, high voltage coils and automotive equipment such as alternators and starters.

EXAMPLE

An encapsulating composition was made by mixing together the following materials:

(a) low viscosity cycloaliphatic epoxy resin known as Araldit CY 179 obtained from Ciba-Geigy GmbH.

(b) methylnadic anhydride (methylendomethylene tetrahydrophthalic anhydride) as hardener;

(c) 1-methylimidazol obtained under the trade designation DY 070 from Ciba-Geigy GmbH, as accelerator;

(d) Silbond FW 12 EST from Quarzwerke GmbH (amorphous $SiO_2$) as filler;

(e) iron oxide black 0095 obtained from BASF and having pigment black 11 color index.

The materials (a), (b) and (c) were supplied in the ratio 100:120:2. The filler content was 60.3% by weight and the iron oxide content was about 0.3%, in each case relative to the entire mixture weight. Hardening was performed over a period of 12 hours, of which six hours were at 75° C. and six hours at 210° C. The hardened encapsulating mass had the following characteristics:

| | |
|---|---|
| linear thermal expansion coefficient up to 210° C. | 27 to 30 × $10^{-6}$ 1/°C. |
| same, above 210° C. | 90 to 100 × $10^{-6}$ 1/°C. |
| glass transition temperature Tg | 210° C. |
| heat conductivity | 0.59 W/m K |

The viscosity of the encapsulating material was about 40,000 mPas, measured at 25° C. The encapsulating material thus manufactured was used to encapsulate diodes.

The encapsulation of diodes was performed at room temperature through a four-nozzle or eight-nozzle injection device while the supply container for the encapsulating material was under pressure.

Very short injection squirt times (ca.5 s) could be maintained with quick removal of filaments and good operation of injection. At every stop of the machine there was no after-drip from the nozzles.

The diodes thus encapsulated were found to be electrically operable up to temperatures in the range above 200° C.

We claim:

1. An encapsulating material for electrical and electronic components comprising an epoxy-base resin selected from the group consisting of cycloaliphatic epoxide resins, polyfunctional epoxy-novolac resin and mixtures of a cycloaliphatic epoxide resin and a polyfunctional epoxy-novolac resin, and further consisting essentially, for every 100 parts by weight of said epoxy-base resin, of:

90 to 120 parts by weight of methylnadic anhydride, as a hardener;

0.2 to 2 parts by weight of an imidazole-based accelerator;

55 to 70 parts by weight of an amorphous $SiO_2$-base filler;

0 to 2 parts by weight of pigment; and 0 to 0.5 parts by weight of a hollow glass spherical particles, as a supplementary filler.

2. The encapsulating material of claim 1, wherein said epoxy-base resin is a cycloaliphatic epoxide resin which is thinly flowable at room temperature.

3. The encapsulating material of claim 1, wherein said epoxy-base resin is a mixture of a cycloaliphatic epoxide resin which is thinly flowable at room temperature and a polyfunctional epoxy-novolac resin having a viscosity of 1100 to 1700 mPas at 52° C.

4. The encapsulating material of claim 1, wherein said filler contains amorphous $SiO_2$ which has been treated with epoxysilane.

5. The encapsulating material of claim 1, wherein the bulk of amorphous $SiO_2$ in said filler has a grain size not less than $2\mu m$ and not more than $100\mu m$ and the fines content of said amorphous $SiO_2$, defined as having a grain size less than $2.5\mu m$, is kept as small as possible.

6. The encapsulating material of claim 4, wherein the bulk of amorphous $SiO_2$ in said filler has a grain size not less than $2\mu m$ and not more than $100\mu m$ and the fines content of said amorphous $SiO_2$, defined as having a grain size less than $2.5\mu m$, is kept as small as possible.

7. The encapsulating material of claim 1, wherein said pigment contains iron oxide.

8. The encapsulating material of claim 1, wherein there is a content of said hollow glass spherical particles in an amount which is at least 0.1 parts by weight for every 100 parts by weight of said epoxy-base resin.

9. The encapsulating material of claim 1, wherein the content of said amorphous $SiO_2$-base filler is between 55 and 61 parts by weight for every 100 parts by weight for every 100 parts by weight of said epoxy-base resin.

* * * * *